(12) United States Patent
Jayasingh et al.

(10) Patent No.: US 11,379,452 B2
(45) Date of Patent: *Jul. 5, 2022

(54) DATABASE TOOL

(71) Applicant: Bank of America Corporation, Charlotte, NC (US)

(72) Inventors: Magaranth Jayasingh, Chennai (IN); Anirudh Kumar Sharma, Gurugram (IN)

(73) Assignee: Bank of America Corporation, Charlotte, NC (US)

(*) Notice: Subject to any disclaimer, the term of this patent is extended or adjusted under 35 U.S.C. 154(b) by 39 days.

This patent is subject to a terminal disclaimer.

(21) Appl. No.: 17/112,379

(22) Filed: Dec. 4, 2020

(65) Prior Publication Data

US 2021/0089509 A1    Mar. 25, 2021

Related U.S. Application Data (63) Continuation of application No. 16/199,925, filed on Nov. 26, 2018, now Pat. No. 10,915,517.

(51) Int. Cl.
| | | |
|---|---|---|
| *G06F 16/00* | (2019.01) | |
| *G06F 16/22* | (2019.01) | |
| *G06F 12/0868* | (2016.01) | |
| *G06F 17/18* | (2006.01) | |
| *G06F 16/2455* | (2019.01) | |

(52) U.S. Cl.
CPC ...... *G06F 16/2282* (2019.01); *G06F 12/0868* (2013.01); *G06F 16/24552* (2019.01); *G06F 17/18* (2013.01)

(58) Field of Classification Search
CPC .............. G06F 12/0877; G06F 17/18; G06F 16/24552; G06F 16/2822; G06F 12/0868
See application file for complete search history.

(56) References Cited

U.S. PATENT DOCUMENTS

| | | | |
|---|---|---|---|
| 8,983,900 B2 | 3/2015 | Hegde et al. | |
| 9,317,434 B2 | 4/2016 | Bairavasundaram et al. | |
| 9,317,435 B1* | 4/2016 | Bairavasundaram | G06F 12/0848 |
| 9,396,018 B2 | 7/2016 | Schneider et al. | |
| 9,449,188 B2 | 9/2016 | Schneider et al. | |
| 9,652,287 B2* | 5/2017 | van Gulik | G06F 16/212 |
| 9,734,221 B2* | 8/2017 | Sarferaz | G06F 16/252 |
| 9,990,308 B2* | 6/2018 | Krishnappa | G06F 16/24552 |
| 2012/0310934 A1* | 12/2012 | Peh | G06F 16/219 707/736 |
| 2015/0088805 A1* | 3/2015 | Kakarla | G06F 16/217 707/600 |
| 2016/0132502 A1* | 5/2016 | Balasa Ramnath | G06F 16/2272 707/689 |

(Continued)

*Primary Examiner* — Leslie Wong (57) ABSTRACT

A memory stores a first cache and a second cache. A processor copies a first portion of data from a first table stored in a database into a second table. The processor further determines that a second portion of data from the first table will be overwritten and copies the second portion into a third table. The processor further determines that a probability that a user will access a third portion of the first table is greater than a threshold and copies the third portion into the first cache. The processor further determines a fourth portion of the first table that the user accesses at a frequency greater than a set frequency and copies the fourth portion into the second cache.

20 Claims, 6 Drawing Sheets

(56) References Cited

U.S. PATENT DOCUMENTS

| | | | |
|---|---|---|---|
| 2017/0060925 A1* | 3/2017 | Levandoski | G06F 16/2282 |
| 2017/0139833 A1* | 5/2017 | Barajas Gonzalez | G06F 12/0862 |
| 2017/0149924 A1* | 5/2017 | Peterson | G06F 12/0868 |
| 2017/0293649 A1* | 10/2017 | Finlay | G06F 16/283 |
| 2019/0236203 A1* | 8/2019 | De Boer | G06F 16/3328 |
| 2019/0310942 A1* | 10/2019 | Yamamoto | G11B 5/00817 |
| 2019/0347342 A1* | 11/2019 | Kameswaran | G06F 11/3409 |
| 2020/0167422 A1 | 5/2020 | Jayasingh et al. | |
| 2020/0167423 A1 | 5/2020 | Jayasingh et al. | |
| 2020/0334232 A1* | 10/2020 | Arye | G06F 16/215 |
| 2021/0279237 A1* | 9/2021 | Idreos | G06F 17/18 |

\* cited by examiner

DATABASE TOOL

CROSS-REFERENCE TO RELATED APPLICATIONS

This application is a continuation of U.S. patent application Ser. No. 16/199,925 filed Nov. 26, 2018, by Magaranth Jayasingh et al., and entitled "DATABASE TOOL," which is incorporated herein by reference.

TECHNICAL FIELD

This disclosure relates generally to storage and access of data within databases.

BACKGROUND

Computer databases are commonly used by organizations to store large amounts of data. Such databases not only provide a convenient means to store and retrieve data used in the day to day operations of the organization but are often used both internally by employees and externally by customers.

SUMMARY OF THE DISCLOSURE

Computer databases are commonly used by organizations to store large amounts of data. Such databases not only provide a convenient means to store and retrieve data used in the day to day operations of the organization but are often used both internally by employees and externally by customers. Typically, organizations house the data associated with each of these uses in two separate databases—an operational database to service customers, and an analytical database to service employees. This is done because the customers and the employees are typically different sets of people with different database access patterns; customers provide high traffic to the database, while employees provide much lower traffic and typically require access to only a subset of the data used by the customers (e.g., to analyze customer use). By maintaining two separate databases, an organization can tailor the computer hardware used for each database according to requirements dictated by these different access patterns.

Difficulties arise when maintaining two separate databases, however, because of the need to keep the redundant data stored in both databases synchronized. As the amount of such data grows, it becomes increasingly likely that a failure to properly synchronize the two databases will occur, resulting in data quality issues.

This disclosure contemplates an unconventional database tool that enables the use of a single database to store both the operational data and the analytical data maintained by an organization. The database tool copies portions of the operational data stored within an operational table in a database into an analytical table stored in the same database. The database tool then performs statistical analysis operations on the data copied from the operational table and stores the results in the analytical table. The database tool further stores portions of purged operational data in a historical analytical table, thereby providing employees with access to historical operational data. To reduce traffic to the database, the database tool uses historical user access patterns to predict which portions of the operational database users will access in the future, and then copies these portions, along with portions of the operational table that users frequently access, into memory. Certain embodiments of the database tool are described below.

According to one embodiment, an apparatus includes a memory and a hardware processor communicatively coupled to the memory. The memory stores a first cache and a second cache. The processor copies a first portion of data from a first table stored in a database into a second table stored in the database. The first portion of data from the first table includes data stored at locations in the first table flagged with an identifier. In response to copying the first portion of data from the first table stored in the database into the second table stored in the database, the hardware processor performs a set of statistical analysis techniques on the first portion of data copied from the first table stored in the database into the second table stored in the database and stores the results of the set of statistical analysis techniques into the second table stored in the database. The processor further determines that a second portion of data from the first table stored in the database is set to be overwritten. The second portion of data from the first table stored in the database includes data stored at locations in the first table flagged with the identifier. In response to determining that the second portion of the first table stored in the database is set to be overwritten, the processor copies the second portion of data from the first table stored in the database into a third table stored in the database. The third table has the same structure as the second table. In response to copying the second portion of data from the first table stored in the database into the third table stored in the database, the processor performs the set of statistical analysis techniques on the second portion of data copied from the first table stored in the database into the third table stored in the database and stores the results of the set of statistical analysis techniques into the third table stored in the database. The processor further determines, based on a set of historical information, that a probability that a user will access a third portion of the first table stored in the database at a future date is greater than a set threshold, and in response to determining that the probability that the user will access the third portion of the first table stored in the database at the future date is greater than the set threshold, the processor copies the third portion of the first table stored in the database into the first cache prior to the future date. The processor further determines a fourth portion of the first table stored in the database that the user accesses at a frequency greater than a set frequency, and in response to determining the fourth portion of the first table stored in the database that the user accesses at the frequency greater than the set frequency, copies the fourth portion of the first table stored in the database into the second cache.

According to another embodiment, a method includes copying a first portion of data from a first table stored in a database into a second table stored in the database. The first portion of data from the first table includes data stored at locations in the first table flagged with an identifier. In response to copying the first portion of data from the first table stored in the database into the second table stored in the database, the method includes performing a set of statistical analysis techniques on the first portion of data copied from the first table stored in the database into the second table stored in the database, and storing the results of the set of statistical analysis techniques into the second table stored in the database. The method also includes determining that a second portion of data from the first table stored in the database is set to be overwritten. The second portion of data from the first table stored in the database includes data stored at locations in the first table flagged with the identifier. In response to determining that the second portion of the first table stored in the database is set to be overwritten, the method includes copying the second portion of data from the first table stored in the database into a third table stored in the database. The third table has the same structure as the second table. In response to copying the second portion of data from the first table stored in the database into the third table stored in the database, the method further includes performing the set of statistical analysis techniques on the second portion of data copied from the first table stored in the database into the third table stored in the database, and storing the results of the set of statistical analysis techniques into the third table stored in the database. The method further includes determining, based on a set of historical information, that a probability that a user will access a third portion of the first table stored in the database at a future date is greater than a set threshold, and in response to determining that the probability that the user will access the third portion of the first table stored in the database at the future date is greater than the set threshold, copying the third portion of the first table stored in the database into a first cache prior to the future date. The method also includes determining a fourth portion of the first table stored in the database that the user accesses at a frequency greater than a set frequency, and in response to determining the fourth portion of the first table stored in the database that the user accesses at the frequency greater than the set frequency, copying the fourth portion of the first table stored in the database into a second cache.

According to another embodiment, a system includes a storage element operable to store a first cache and a second cache, and a processing element communicatively coupled to the storage element. The processing element is operable to copy a first portion of data from a first table stored in a database into a second table stored in the database. The first portion of data from the first table includes data stored at locations in the first table flagged with an identifier. In response to copying the first portion of data from the first table stored in the database into the second table stored in the database, the processing element is operable to perform a set of statistical analysis techniques on the first portion of data copied from the first table stored in the database into the second table stored in the database. The set of statistical analysis techniques includes statistical analysis techniques defined by a user. The processing element is further operable to store the results of the set of statistical analysis techniques into the second table stored in the database. The processing element is further operable to determine that a second portion of data from the first table stored in the database is set to be overwritten. The second portion of data from the first table stored in the database includes data stored at locations in the first table flagged with the identifier. In response to determining that the second portion of the first table stored in the database is set to be overwritten, the processing element is operable to copy the second portion of data from the first table stored in the database into a third table stored in the database. The third table has the same structure as the second table. In response to copying the second portion of data from the first table stored in the database into the third table stored in the database, the processing element is further operable to perform the set of statistical analysis techniques on the second portion of data copied from the first table stored in the database into the third table stored in the database, and store the results of the set of statistical analysis techniques into the third table stored in the database. The processing element is further operable to determine, based on a set of historical information, that a probability that the user will access a third portion of the first table stored in the database at a future date is greater than a set threshold, and in response to determining that the probability that the user will access the third portion of the first table stored in the database at the future date is greater than the set threshold, copy the third portion of the first table stored in the database into the first cache prior to the future date. The processing unit is further operable to determine a fourth portion of the first table stored in the database that the user accesses at a frequency greater than a set frequency, and in response to determining the fourth portion of the first table stored in the database that the user accesses at the frequency greater than the set frequency, copy the fourth portion of the first table stored in the database into the second cache.

According to another embodiment, an apparatus includes a memory and a hardware processor communicatively coupled to the memory. The memory stores a first cache and a second cache. The processor stores a first query submitted by a user to a database in a transaction log. The processor further selects a set of information from the transaction log and stores the set of information in a repository. The set of information includes the first query, the date the user submitted the first query, and an identification of the user. The processor further determines, based on the set of information, that a probability that the user will access a first portion of the database at a future date is greater than a set threshold, and in response to determining that the probability that the user will access the first portion of the database at the future date is greater than the set threshold, the processor copies the first portion of the database into the first cache prior to the future date. The processor further determines a second portion of the database that the user accesses at a frequency greater than a set frequency, and in response to determining the second portion of the database that the user accesses at the frequency greater than the set frequency, copies the second portion of the database into the second cache. The processor further determines that a portion of data stored in the second cache is also stored in the first cache, and in response to determining that the portion of data stored in the second cache is also stored in the first cache, deletes the portion of data that is stored in the second cache and is also stored in the first cache from the second cache. The processor also receives a second query from the user, determines that the second query is directed at data stored in the first cache, and in response to determining that the second query is directed at data stored in the first cache, accesses the data stored in the first cache. The processor also determines that the second query is not directed at data stored in the first cache, in response to determining that the second query is not directed at data stored in the first cache, determines that the second query is directed at data stored in the second cache, and in response to determining that the second query is directed at data stored in the second cache, accesses the data stored in the second cache.

According to another embodiment, a method includes storing a first query submitted by a user to a database in a transaction log. The method also includes selecting a set of information from the transaction log and storing the set of information in a repository. The set of information includes the first query, the date the user submitted the first query, and an identification of the user. The method further includes determining, based on the set of information, that a probability that the user will access a first portion of the database at a future date is greater than a set threshold, and in response to determining that the probability that the user will access the first portion of the database at the future date is greater than the set threshold, copying the first portion of the database into the first cache prior to the future date. The method also includes determining a second portion of the database that the user accesses at a frequency greater than a set frequency, and in response to determining the second portion of the database that the user accesses at the frequency greater than the set frequency, copying the second portion of the database into the second cache. The method additionally includes determining that a portion of data stored in the second cache is also stored in the first cache, and in response to determining that the portion of data stored in the second cache is also stored in the first cache, deleting the portion of data that is stored in the second cache and is also stored in the first cache from the second cache. The method further includes receiving a second query from the user, determining that the second query is directed at data stored in the first cache, and in response to determining that the second query is directed at data stored in the first cache, accessing the data stored in the first cache. The method also includes determining that the second query is not directed at data stored in the first cache, in response to determining that the second query is not directed at data stored in the first cache, determining that the second query is directed at data stored in the second cache, and in response to determining that the second query is directed at data stored in the second cache, accessing the data stored in the second cache.

According to yet another embodiment, a system includes a storage element operable to store a first cache and a second cache, and a processing element communicatively coupled to the storage element. The processing element is operable to store a first query submitted by a user to a database in a transaction log. The processing element is further operable to select a set of information from the transaction log and store the set of information in a repository. The set of information includes the first query, the date the user submitted the first query, and an identification of the user. The processing element is further operable to determine, using a machine learning model operating on the set of information, that a probability that the user will access a first portion of the database at a future date is greater than a set threshold, and in response to determining that the probability that the user will access the first portion of the database at the future date is greater than the set threshold, copy the first portion of the database into the first cache prior to the future date. The processing element is also operable to determine a second portion of the database that the user accesses at a frequency greater than a set frequency, and in response to determining the second portion of the database that the user accesses at the frequency greater than the set frequency, copy the second portion of the database into the second cache. The processing element is also operable to determine that a portion of data stored in the second cache is also stored in the first cache, and in response to determining that the portion of data stored in the second cache is also stored in the first cache, delete the portion of data that is stored in the second cache and is also stored in the first cache from the second cache. The processing element is further operable to receive a second query from the user, determine that the second query is directed at data stored in the first cache, and in response to determining that the second query is directed at data stored in the first cache, access the data stored in the first cache. The processing is additionally operable to determine that the second query is not directed at data stored in the first cache, in response to determining that the second query is not directed at data stored in the first cache, determine that the second query is directed at data stored in the second cache, and in response to determining that the second query is directed at data stored in the second cache, access the data stored in the second cache.

Certain embodiments provide one or more technical advantages. For example, an embodiment allows an organization to store data accessed by customers in the same database as the data used by employees, thereby avoiding the need to store redundant data in multiple databases. As another example, an embodiment reduces user traffic to a database by predicting that a user will access a portion of the database at a future date and storing that portion of the database, along with frequently accessed portions of the database, in memory. As a further example, an embodiment reduces the time required for user queries to the database to execute, by storing portions of the database that the user is likely to access in memory, and checking the memory first for the requested data, before accessing the database. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 6 of the drawings, like numerals being used for like and corresponding parts of the various drawings.

Computer databases are commonly used by organizations to store large amounts of data. Such databases not only provide a convenient means to store and retrieve data used in the day to day operations of the organization but are often used both internally by employees and externally by customers. Typically, organizations house the data associated with each of these uses in two separate databases—an operational database to service customers, and an analytical database to service employees. This is done because the customers and the employees are typically different sets of people with different database access patterns; customers provide high traffic to the database, while employees provide much lower traffic and typically require access to only a subset of the data used by the customers (e.g., to analyze customer use). By maintaining two separate databases, an organization can tailor the computer hardware used for each database according to requirements dictated by these different access patterns.

Difficulties arise when maintaining two separate databases, however, because of the need to keep the redundant data stored in both databases synchronized. As the amount of such data grows, it becomes increasingly likely that a failure to properly synchronize the two databases will occur, resulting in data quality issues.

Figure 1:
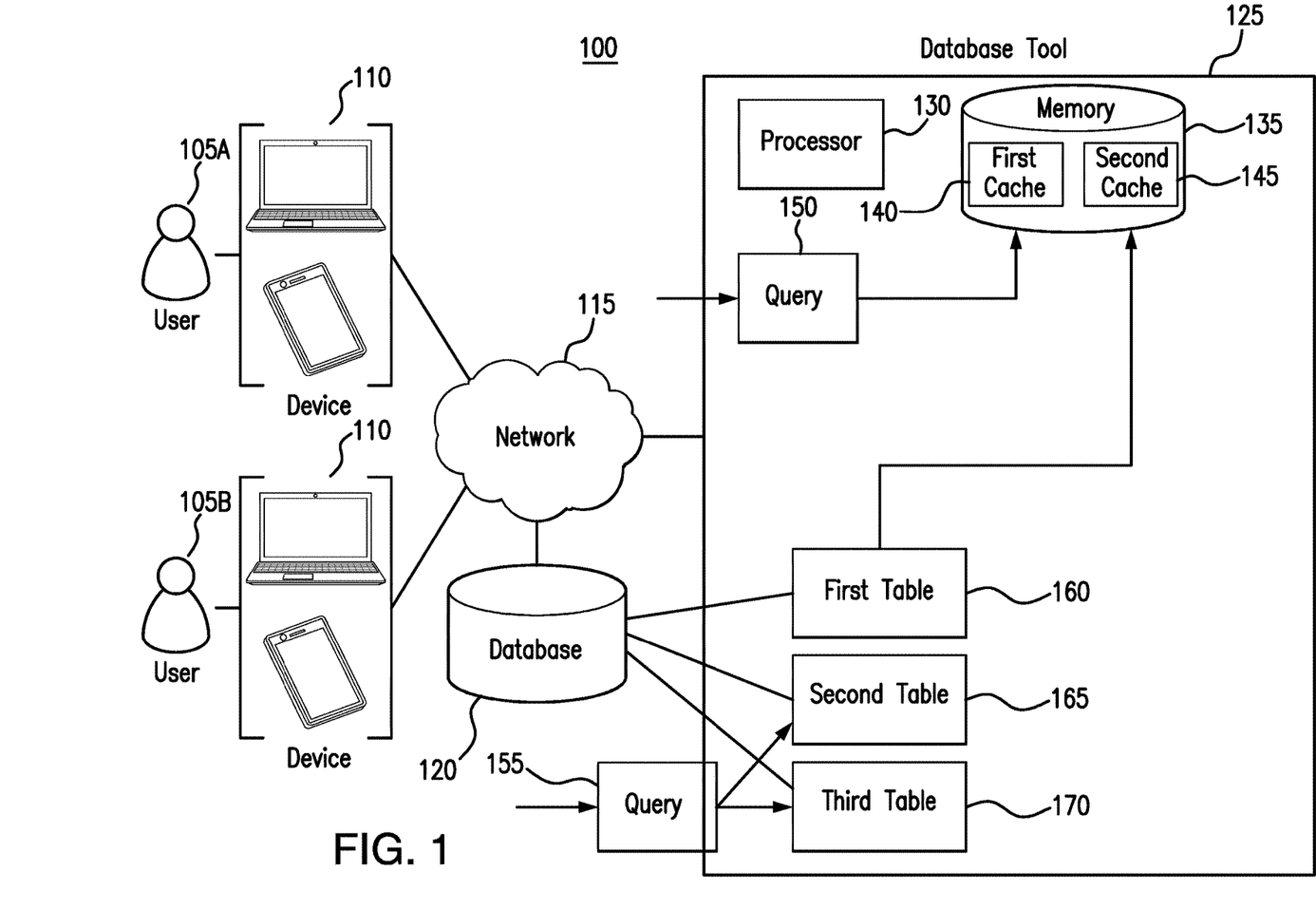
FIG. 1 illustrates an example system.
Figure 2A:
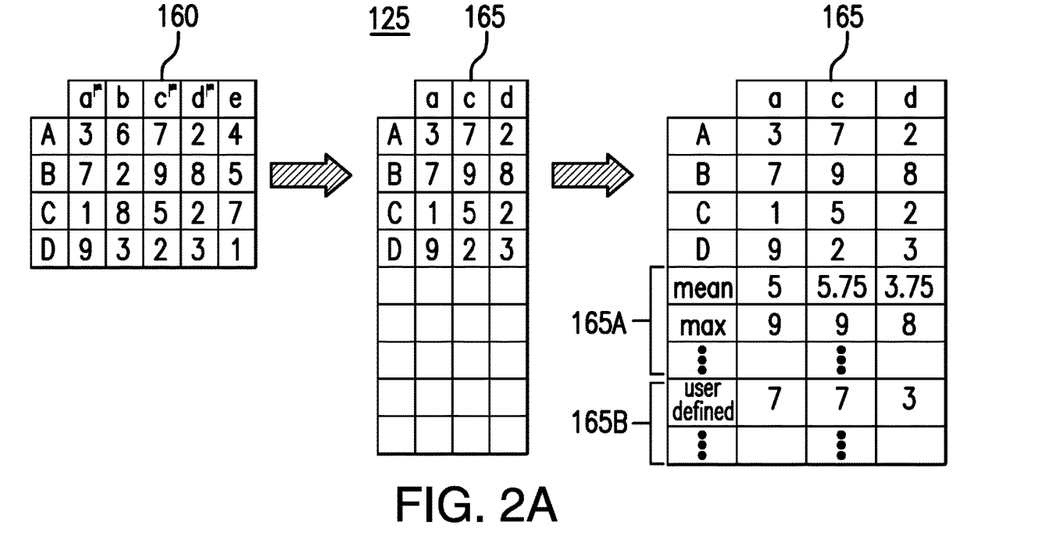
FIG. 2A illustrates an example of the creation of the second table from the first table of the system of FIG. 1.
Figure 2B:
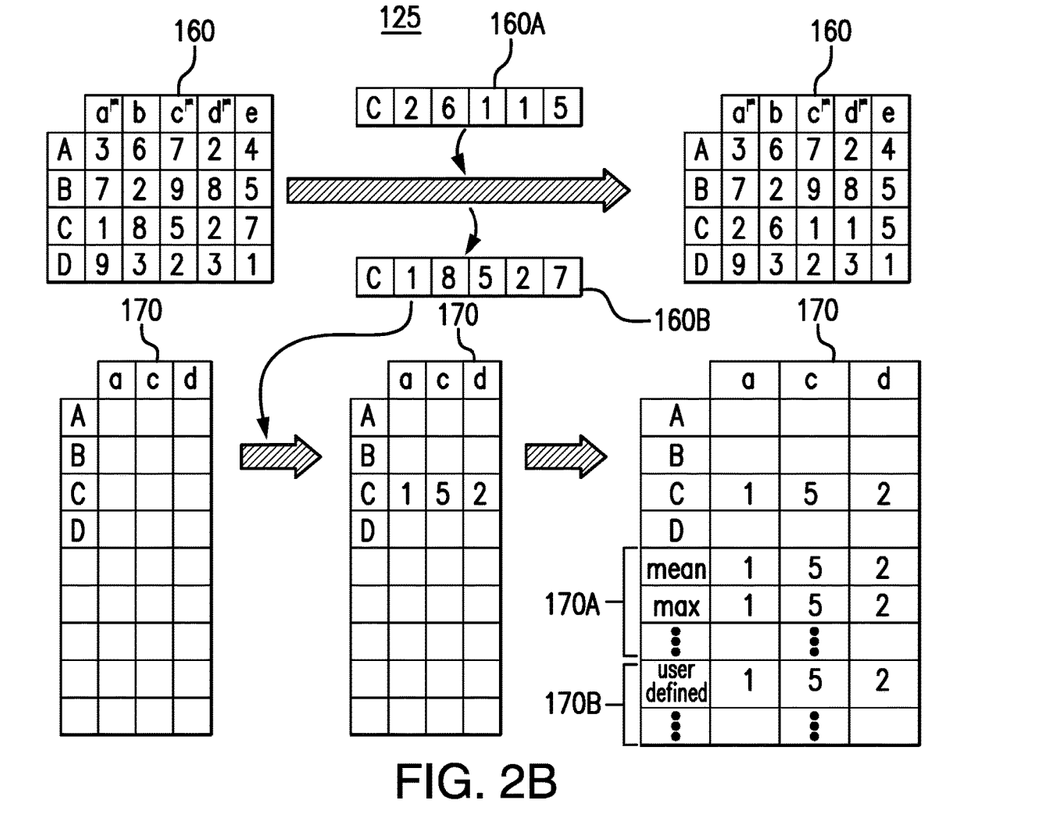
FIG. 2B illustrates an example of the creation of the third table from data purged from the first table of the system of FIG. 1.
Figure 3:
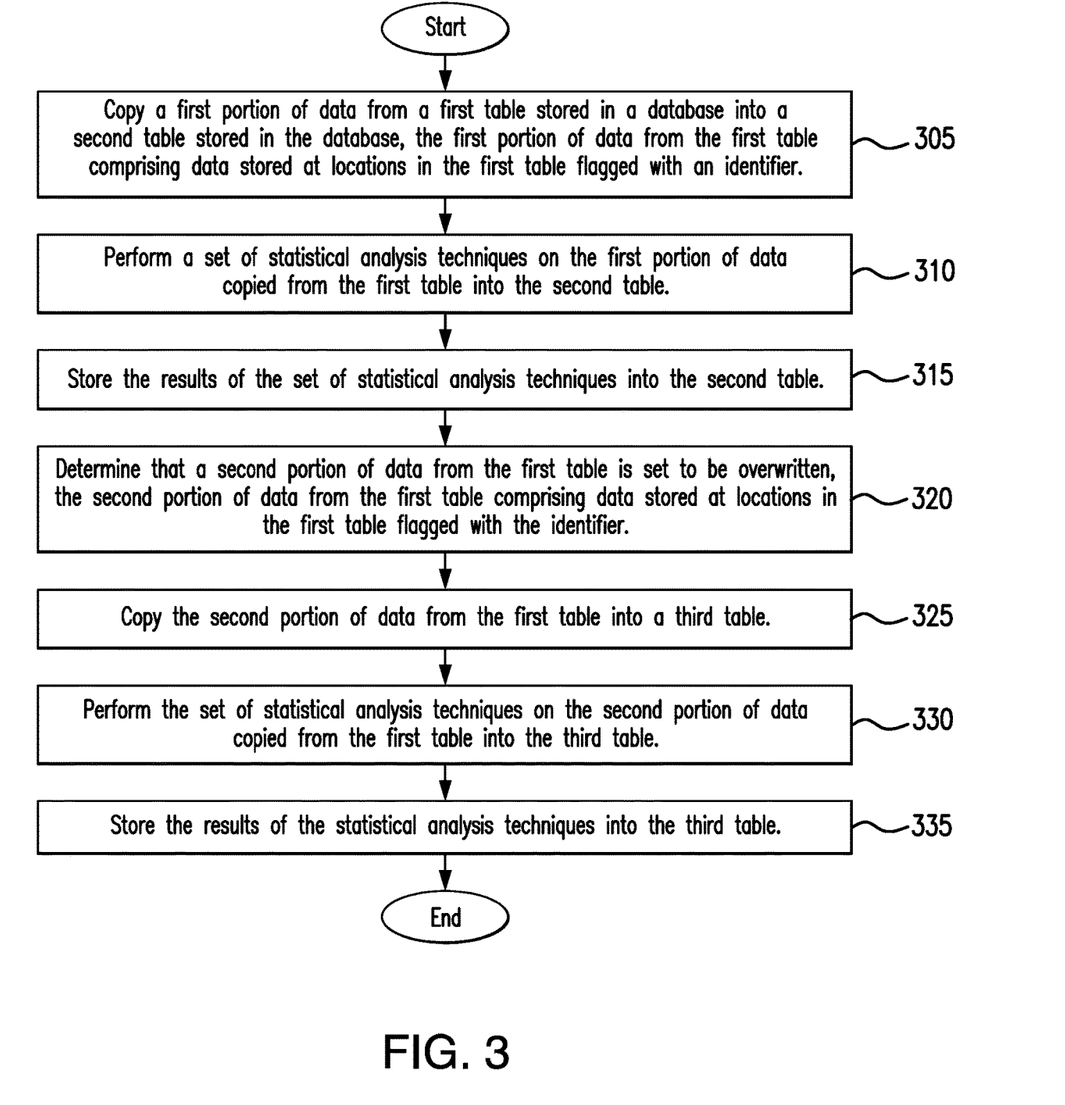
FIG. 3 is a flowchart illustrating a method for creating the second and the third tables of the system of FIG. 1.
Figure 4:
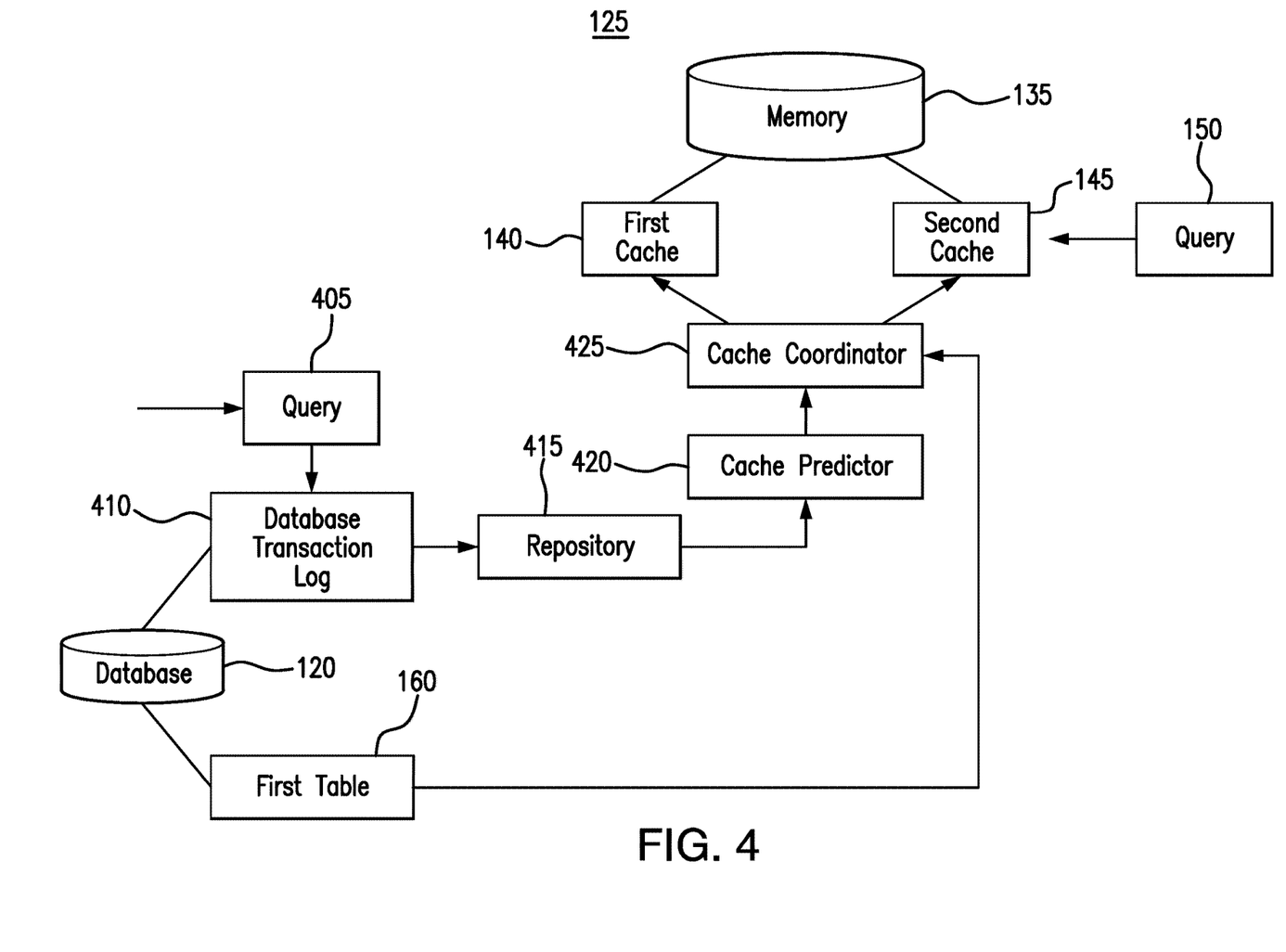
FIG. 4 illustrates an example database tool of the system of FIG. 1.
Figure 5:
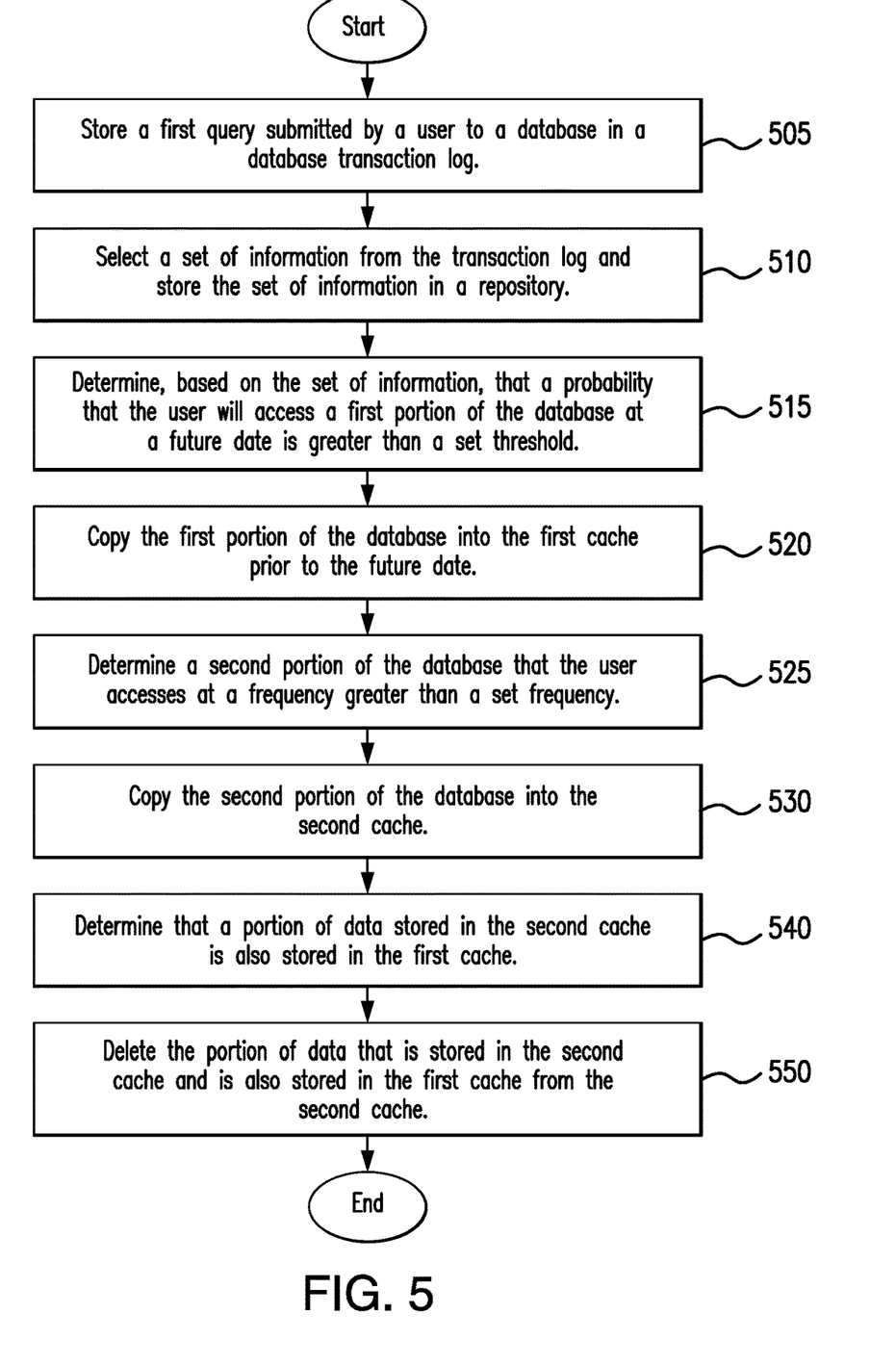
FIG. 5 is a flowchart illustrating a method for populating the memory of the database tool of FIG. 4.
Figure 6:
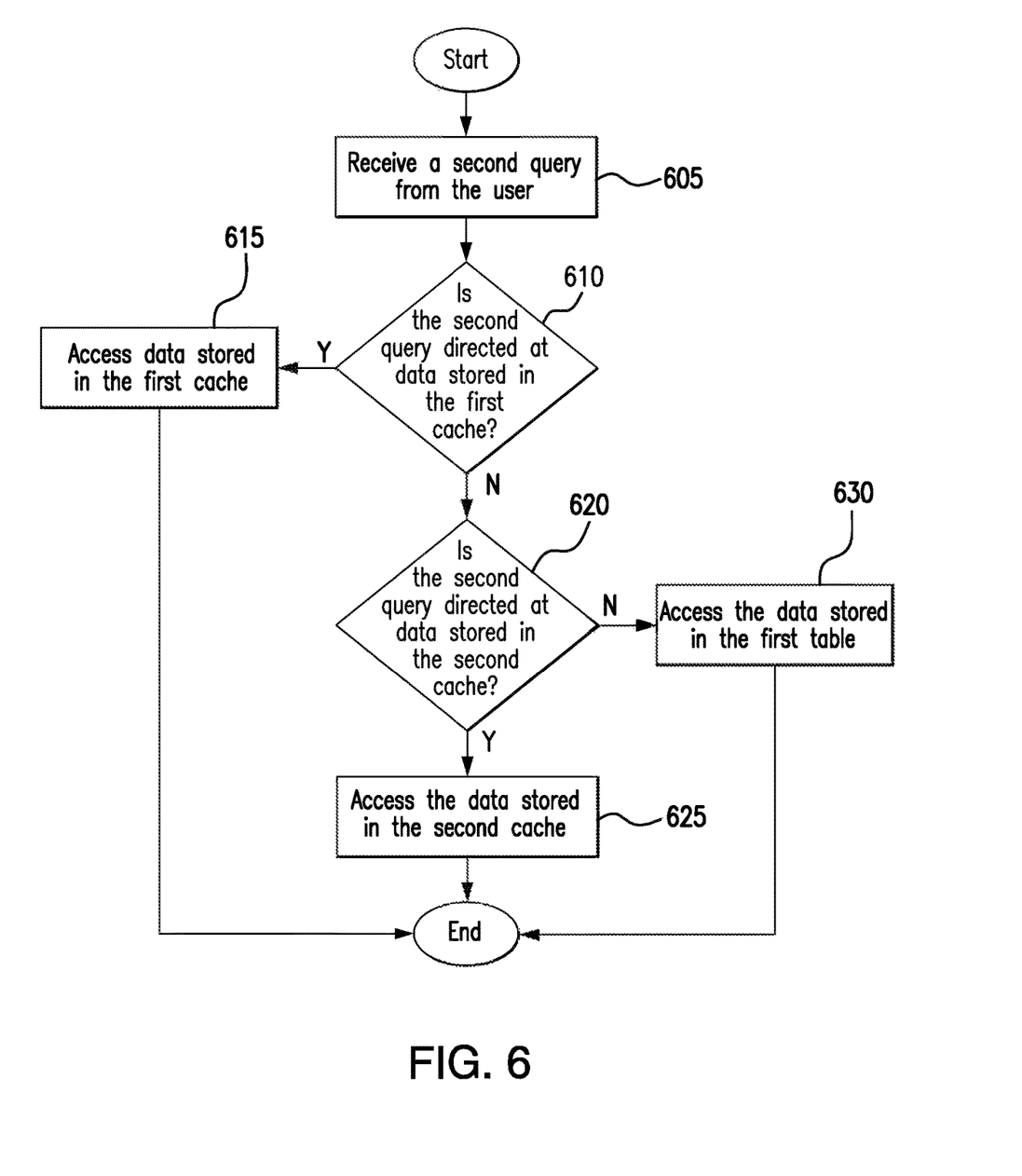
FIG. 6 is a flowchart illustrating the process of accessing data requested by a user query, using the database tool of FIG. 4.

This disclosure contemplates an unconventional database tool that enables the use of a single database to store both the operational data and the analytical data maintained by an organization. The database tool copies portions of the operational data stored within an operational table in a database into an analytical table stored in the same database. The database tool then performs statistical analysis operations on the data copied from the operational table and stores the results in the analytical table. The database tool further stores portions of purged operational data in a historical analytical table, thereby providing employees with access to historical operational data. To reduce traffic to the database, the database tool uses historical user access patterns to predict which portions of the operational database users will access in the future, and then copies these portions, along with portions of the operational table that users frequently access, into memory. By enabling an organization to store data used externally by customers and data used internally by employees in the same database, the database tool obviates the need to store redundant data in multiple databases and thereby eliminates the risk that data quality issues will arise from a failure to properly synchronize multiple databases. The database tool will be described in more detail using FIGS. 1 through 6. FIG. 1 shows a system that includes the database tool. FIGS. 2A, 2B, and 3 show the database tool creating tables within the database for use by employees and customers. FIGS. 4 and 5 show the database tool predicting access patterns and storing the data associated with such predictions in memory. FIG. 6 illustrates the process by which a user query accesses data stored in the database.

FIG. 1 illustrates an example system 100. As seen in FIG. 1, system 100 includes one or more devices 110, a network 115, a database 120, and a database tool 125. Generally, database tool 125 enables an organization to store data accessed by two different types of users, with different data access patterns, in the same database. For example, database tool 125 enables an organization to store data accessed by high traffic users 105A, such as customers, in the same database 120 as data accessed by lower traffic users 105B, such as employees analyzing customer behavior. In this example, data accessed by high traffic users 105A is stored in first table 160, while the data accessed by lower traffic users 105B is stored in second table 165 and third table 170. Storing the data in a single database 120 avoids potential data quality issues that may arise from a need to synchronize data across multiple databases. In certain embodiments, database tool 125 additionally decreases the time required to execute a query 150 submitted to database 120 from users 105A by storing portions of database 120 that users 105A are likely to access in memory 135.

Devices 110 are used by users 105 to submit database queries to database 120. For example, users 105 can use devices 110 to communicate a query or a list of queries to database tool 125. Database tool 125 then determines whether to direct the query (or list of queries) to memory 135, first table 160, second table 165 or third table 170. Devices 110 may also receive the results of the database queries submitted to database 120. In certain embodiments, devices 110 may communicate with database tool 125 through network 115 via a web interface.

Devices 110 include any appropriate device for communicating with components of system 100 over network 115. For example, devices 110 may be a telephone, a mobile phone, a computer, a laptop, a tablet, an automated assistant, and/or a cash register. This disclosure contemplates device 110 being any appropriate device for sending and receiving communications over network 115. As an example, and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 120 stores an organization's data—generally, the organization's organizational and analytical data. For example, database 120 stores data accessed by high traffic users 105A (such as customers) in first table 160, and data accessed by lower traffic users 105B (such as employees analyzing customer behavior) in second table 165 and third table 170. Third table 170 stores a historical version of the data stored in second table 165.

This disclosure contemplates database 120 storing data in first table 160, second table 165, and third table 170 in any format. In certain embodiments, database 120 stores data in first table 160, second table 165, and third table 170 contiguously. In such embodiments, database 120 may additionally store data in first table 160, second table 165, and third table 170 in column major order or in row major order As seen in FIG. 1, database tool 125 includes a processor 130 and a memory 135. This disclosure contemplates processor 130 and memory 135 being configured to perform any of the functions of database tool 125 described herein. Generally, database tool 125 creates second table 165 from a subset of data in first table 160 that users 105B access, and third table 170 from portions of that subset of data in first table 160 that users 105B access and that are set to be overwritten. When database tool receives a query 155 from lower traffic users 105B it is thus able to direct the query to second table 165 and/or third table 170.

Additionally, database tool 125 predicts which portions of first table 160 a high traffic user 105A will likely access in the future and copies these portions of first table 160 into first cache 140 in memory 135. Database tool 125 further copies those portions of first table 160 that users 105A access most frequently into second cache 145 in memory 135. In certain embodiments, database tool 125 compares the data stored in first cache 140 to that stored in second cache 145 and deletes redundant data from second cache 145. When database tool 125 receives a query 150 from a user 105A, it first checks memory 135 to determine if the query is directed at data stored in first cache 140 or second cache 145 before directing the query to first table 160. Thus, certain embodiments of database tool 125 reduce user traffic directed to database 120.

Processor 130 is any electronic circuitry, including, but not limited to microprocessors, application specific integrated circuits (ASIC), application specific instruction set processor (ASIP), and/or state machines, that communicatively couples to memory 140 and controls the operation of database tool 125. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 130 may include other hardware and software that operates to control and process information. Processor 130 executes software stored on memory to perform any of the functions described herein. Processor 130 controls the operation and administration of database tool 125 by processing information received from network 115, device(s) 110, and memory 135. Processor 130 may be a programmable logic device, a microcontroller, a microprocessor, any suitable processing device, or any suitable combination of the preceding. Processor 130 is not limited to a single processing device and may encompass multiple processing devices.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein.

Database tool 125 forms second table 165 from first table 160 by first copying portions of first table 160 into second table 165, where the portions of first table 160 to be copied have been flagged with an identifier. Certain embodiments contemplate the portions of first table 160 to be copied being flagged with an identifier by a user 105B when first table 160 is initially created. Second table 165 additionally includes the results of statistical analysis operations performed by database tool 125 on the data copied from first table 160 into second table 165. Database tool 125 forms third table 170 from data in first table 160 that is flagged with the identifier and is set to be overwritten. Database tool 125 then performs the same set of statistical operations performed on second table 165 on third table 170 and stores the results in third table 170.

The set of statistical analysis operations could include any operation to be performed on the data copied from first table 160 into second table 165. In certain embodiments of database tool 125, the set of statistical analysis operations includes at least one of calculating the mean, the standard deviation, the minimum, the maximum, the count and a given percentile of the data. Certain embodiments additionally contemplate the set of statistical analysis operations including statistical analysis operations specified by users 105B.

In particular embodiments, system 100 reduces the likelihood that data quality issues will arise in an organization's stored data, by removing the need to store such data in multiple databases, and synchronize the data among these databases, by using database tool 125. In particular embodiments, system 100 further reduces the traffic directed to a database 120, by storing portions of the database 120 that users 105 are likely to access in memory 135.

In order to store an organization's data within a single database 120, system 100 creates multiple tables within database 120. FIGS. 2A, 2B, and 3 illustrate database tool 125 creating these tables, where first table 160 is used by high traffic users 105A, such as customers, while second table 165 and third table 170 are used by lower traffic users 105B, such as employees.

FIGS. 2A and 2B illustrate an example of the creation of second table 165 and third table 170 from first table 160 by the database tool 125 in system 100 of FIG. 1. For simplicity, the example of FIGS. 2A and 2B describes a first table 160 consisting of five columns of data, with each column consisting of four entries. This disclosure, however, contemplates first table 160 of any size, with data stored within first table 160 in any manner.

In certain embodiments, database tool 125 will store data in first table 160, second table 165, and third table 170 in contiguous blocks. In certain embodiments, database tool 125 will further store data in first table 160, second table 165, and third table 170 in contiguous blocks in column major order. FIGS. 2A and 2B illustrate a particular embodiment in which database tool 125 stores data in first table 160, second table 165, and third table 170 contiguously, in column major order.

FIG. 2A shows the creation of second table 165 from first table 160. In this example, the data from first table 160 that database tool 125 is to copy into second table 165 is identified by column, with a flag. Here, columns a, c, and d are flagged. While this example illustrates data stored in column major format, with individual columns flagged, other embodiments could store and flag the data stored in first table 160 in any manner. In certain embodiments, the data that database tool 125 is set to copy from first table 160 into second table 165 is flagged with the identifier at the time that first table 160 is initially created.

Database tool 125 first copies columns a, c, and d into second table 165. Database tool 125 then performs a set of statistical analysis operations on columns a, c, and d, storing the results of the statistical analysis operations in rows 165A of second table 165. The set of statistical analysis operations typically includes operations that users 105B commonly perform when analyzing organizational data. By storing the results of the statistical analysis operations in table 165, database tool 125 reduces traffic from users 105B to database 120. For example, if a user 105B wishes to determine the mean of the data stored in column a, user 105B accesses only one location of database 120—here, the first entry of the fifth row of table 165—rather than accessing the entries in rows A, B, C, and D, and calculating the mean from these entries.

In the example of FIG. 2A, the set of statistical analysis operations includes a calculation of the mean and the max of a column. However, certain embodiments contemplate statistical analysis operations consisting of at least one of calculating the mean, the standard deviation, the minimum, the maximum, the count, and a given percentile of a subset of the data. Certain embodiments further contemplate the set of statistical analysis calculations to be performed by database tool 125 including user-defined calculations. FIGS. 2A and 2B illustrate one such embodiment, with the results of the set of user-defined operations stored by database tool 125 in rows 165B of second table 165, and rows 170B of third table 170.

In certain embodiments, database tool 125 may create second table 165 from first table 160 any time new data is added to the portions of first table 160 flagged with the identifier. In other embodiments, database tool 125 may create second table 165 from first table 160 at set time intervals. Creating second table 165 from first table 160 at set time intervals may be desirable, for example, to conserve system resources, by limiting the need for processor 130 to perform statistical analysis calculations on the data in second table 125 to the set time intervals, rather than any time new data is added to first table 160.

By creating second table 165 from first table 160, database tool 125 is able to store the current data that users 105B will need to access in a central location in database 120. Then, when database tool 125 receives a query 155 from user 105B, it can direct the query to second table 165, rather than the entire database 120.

FIG. 2B illustrates an example of the creation of third table 170 by database tool 125 from flagged data that is purged from first table 160. In this example, data 160B of first table 160 is set to be overwritten by new data 160A. Upon determining that data 160B from first table 160 is set to be overwritten, database tool 125 copies the portion of data 160B that is flagged with the identifier into third table 170. Database tool 125 then performs the set of statistical analysis operations on the data in third table 170, storing the results of these operations in rows 170A. In certain embodiments, where user-defined calculations are included in the set of statistical analysis operations, the results of the user-defined operations are stored in rows 170B.

In certain embodiments, database tool 125 may perform the set of statistical analysis operations every time new data is copied from first table 160 into third table 170. In other embodiments, database tool 125 may perform the set of statistical analysis operations on data from first table 160 copied into third table 170 at set time intervals. Performing the set of statistical analysis operations at set time intervals may be desirable, for example, to conserve system resources by reducing the number of calculations processor 130 performs.

Third table 170 has the same format as second table 165 and corresponds to a historical version of second table 165 that users 105B may wish to access. By storing historical data, database tool 125 enables users 105B to analyze historical data in addition to current data. This may be desirable, for example, in determining historical trends. Since second table 165 and third table 170 contain all the data in database 120 that users 105B need to access, if database tool 125 receives a query 155 from a user 105B it can immediately direct the query to second table 165 and/or third table 170, instead of the entire database 120.

FIG. 3 is a flow chart illustrating a method 300 for creating second table 165 and third table 170 from first table 160 by database tool 125 in system 100 of FIG. 1. In step 305, database tool 125 begins by copying a first portion of data from first table 160 stored in database 120 into second table 165, also stored in database 120 where the first portion of data from first table 160 comprises data stored at locations in first table 160 flagged with an identifier. In certain embodiments, the locations in first table 160 that are flagged with an identifier, are flagged with the identifier at the time of the creation of first table 160.

In certain embodiments, database tool 125 may create second table 165 from first table 160 any time new data is added to the portions of first table 160 flagged with the identifier. In other embodiments, database tool 125 may create second table 165 from first table 160 at set time intervals. Creating second table 165 from first table 160 at set time intervals may be desirable, for example, to conserve system resources, by limiting the need for processor 130 to perform statistical analysis calculations on the data in second table 125 to the set time intervals, rather than any time new data is added to first table 160.

Database tool 125 then performs a set of statistical analysis techniques on the first portion of data copied from first table 160 into second table 165, in step 310. In step 315, database tool 125 stores the results of the set of statistical analysis techniques into second table 165. In certain embodiments, the set of statistical analysis techniques includes at least one of calculating the mean, the standard deviation, the minimum, the maximum, the count, and a given percentile. In further embodiments, the set of statistical analysis techniques includes statistical analysis techniques set by users 105B. By storing the results of the statistical analysis operations in table 165, database tool 125 reduces traffic from users 105B to database 120; instead of accessing data stored at multiple locations in database 120 and performing the statistical analysis operations on such data, users 105B access a single location in database 120, which holds the result of the statistical analysis operation.

In step 320, database tool determines that a second portion of data from first table 160 is set to be overwritten, where the second portion of data from first table 160 comprises data stored at locations in first table 160 flagged with the identifier. In step 325, database tool 125 copies the second portion of data from first table 160 into a third table 170. Database tool 125 then performs the same set of statistical analysis techniques on this second portion of data copied from first table 160 into third table 170 in step 330. Finally, in step 335, database tool 125 stores the results of the statistical analysis techniques into third table 170.

Modifications, additions, or omissions may be made to method 300 depicted in FIG. 3. Method 300 may include more, fewer, or other steps. For example, steps may be performed in parallel or in any suitable order. While discussed as database tool 125 (or components thereof) performing the steps, any suitable component of system 100, such as device(s) 110 for example, may perform one or more steps of the method.

FIGS. 4 and 5 illustrate database tool 125 predicting the future access patterns of users 105A to database 120 and storing the data associated with such predictions in memory 135. In this manner, certain embodiments of database tool 125 are able to reduce user 105A traffic to database 120, because, as described in FIG. 6, when database tool 125 receives a query 150 from user 105A, it first determines whether query 150 is directed at data stored in memory 135 before directing the query 150 to database 120. Therefore, if database tool 125 accurately predicts which data a user 105A will access at a future date, when user 105A submits a query 150 directed to that data, database tool 125 will access the data in memory 135 rather than in database 120.

FIG. 4 illustrates an example database tool 125 from system 100, illustrated in FIG. 1. For clarity, not all elements of system 100 are illustrated in FIG. 4. Their absence should not be interpreted as their absence or removal from system 100. Generally, database tool 125 uses previous queries 405 submitted by user 105A to predict, using cache predictor 420, which portions of first table 160 user 105A will access in the future. Then using cache coordinator 425, database tool 125 populates first cache 140 in memory 135 with the portions of first table 160 that it has predicted user 105A will access in the future. Additionally, database tool 125 uses cache coordinator 425 to populate second cache 145 with portions of first table 160 that users 105A commonly access. When a user 105A submits a query 150 to database tool 125, database tool 125 first determines whether query 150 is directed at data stored in memory 135 before directing the query to first table 160. If database tool 125 determines that query 150 is directed at data stored in memory 135, database tool 125 accesses memory 135, not database 120. In this manner, certain embodiments of database tool 125 are able to reduce traffic from users 105A to database 120.

To predict which portions of first table 160 a user 105A is likely to access in the future, database tool 125 stores historical queries 405 submitted to the database by users 105A in a database transaction log 410. The database tool 125 then selects a set of information from the database transaction log 410 and stores this set of information in repository 415. This set of information includes the query itself, the date the query was submitted, and the user ID associated with the query. Cache predictor 420 then uses the information stored in repository 415 to predict a user 105A's likely future data access patterns. Specifically, cache predictor 420 calculates the probability that user 105A will access a portion of first table 160 at a future date.

In certain embodiments, cache predictor 420 uses a machine learning model to calculate the probabilities that user 105A will access a portion of first table 160 at a future date. In certain embodiments the machine learning model uses a logistic regression model. For example, the logistic regression model may take the form of the equation: output=$a1+a2X+a3Y+a4Z$, where X is the data the query was submitted, Y is the query, and Z is the user ID associated with the query.

To more accurately predict user access patterns, database tool 125 deletes information stored in repository 415 that is older than a set date. In certain embodiments, the set date is adjustable by users 105. Allowing users 105 to adjust the set date may be desirable because users 105 may have knowledge that their data access patterns changed significantly at some date in the past and that including information relating to their queries prior to that date will not be useful in predicting their future data access patterns. In other embodiments, database tool 125 may update the set date continuously, or at specific time intervals. Allowing database tool 125 to update the set date may be desirable when users 105 do not have knowledge that their data access patterns changed significantly at some date in the past. In such situations, if the set date is adjustable by users 105, users 105 might choose a set date too close to the present date, thereby excluding valuable historical information. Instead, in certain embodiments, database tool 125 may update the set date for all users 105 according to an average time over which the database tool 125 has determined that historical data tends to aid in predicting future user access patterns. Updating the set date at specific time intervals, rather than continuously, may be desirable, for example, to conserve system resources.

Once cache predictor 420 has calculated the probabilities that user 105A will access a portion of first table 160 at a future date, cache coordinator 425 uses this information to populate first cache 140. If the probability that user 105A will access a portion of first table 160 at a future date is greater than a set threshold, cache coordinator 425 copies that portion of first table 160 into first cache 140 at some point in time before that future day. In certain embodiments, the set threshold is set by users 105 of database tool 125. As an example, if cache predictor 420 determines that the probability that user 105A will access a portion of first table 160 in seven days' time is P, then, upon determining that P is greater than the set threshold, cache coordinator 425 will copy the portion of first table 160 into first cache 140 within seven days so that when seven days' time has elapsed, the portion of first table 160 that cache predictor 420 determined user 105A would access is present in first cache 140.

In addition to populating first cache 140 with portions of first table 160 that cache predictor 420 has predicted user 105A will access in the future, cache coordinator 425 also populates second cache 145 with portions of first table 160 that users 105A access, on average, with a frequency greater than a set frequency. In certain embodiments, the set frequency is set by users 105 of database tool 125.

To avoid wasting memory by storing multiple copies of data from first table 160 in memory 134, cache coordinator 425 monitors first cache 140 and second cache 145 for redundant data. Cache coordinator 425 compares the data stored in second cache 145 to the data stored in first cache 140 and deletes any data stored in second cache 145 that is also stored in first cache 140. In certain embodiments cache coordinator 425 continually monitors memory 135 for redundant data. In other embodiments, cache coordinator 425 checks memory 135 for redundant data at set time intervals. Checking memory 135 for redundant data at set time intervals may be desirable, for example, to conserve system resources by reducing the total number of comparisons between data stored in first cache 140 and data stored in second cache 145 that processor 130 performs.

By storing portions of first table 160 that user 105A is likely to access in the future, along with portions of first table 160 that users 105A access with high frequency in memory 135, particular embodiments of database tool 125 are able to reduce user traffic to database 120. When a user 105A submits a query 150 to database tool 125, database tool 125 first determines whether query 150 is directed to data stored in first cache 140. If query 150 is directed to data stored in first cache 140, database tool 125 accesses first cache 140. If query 150 is not directed to data stored in first cache 140, database tool 125 next determines whether query 150 is directed to data stored in second cache 145. If query 150 is directed to data stored in second cache 145, database tool 125 accesses second cache 145. If query 150 is not directed to data stored in second cache 145, database tool 125 accesses first table 160. Thus, the database tool 125 only directs a subset of queries 150 to database 120, reducing overall traffic to database 120.

FIG. 5 is a flowchart illustrating a method 500 for populating the memory 135 of database tool 125 illustrated in FIG. 4. Database tool 125 begins in step 505 by storing a query 405 submitted by user 105A to database 120 in a database transaction log 410. In step 510, database tool 125 selects a set of information from the transaction log 410 and stores the set of information in a repository 415. This set of information includes the query itself, the date the query was submitted, and the user ID associated with the query.

In step 515, database tool 125 determines, based on the set of information stored in repository 415, that a probability that user 105A will access a first portion of first table 160 at a future date is greater than a set threshold. In certain embodiments, the set threshold is adjustable by users 105. Then in step 520, database tool 125 copies the first portion of first table 160 into first cache 140 prior to the future date.

To more accurately predict user access patterns, database tool 125 deletes information stored in repository 415 that is older than a set date. In certain embodiments, the set date is adjustable by users 105. Allowing users 105 to adjust the set date may be desirable because users 105 may have knowledge that their data access patterns changed significantly at some date in the past and that including information relating to their queries prior to that date will not be useful in predicting their future data access patterns. In other embodiments, database tool 125 may update the set date continuously, or at specific time intervals. Allowing database tool 125 to update the set date may be desirable when users 105 do not have knowledge that their data access patterns changed significantly at some date in the past. In such situations, if the set date is adjustable by users 105, users 105 might choose a set date too close to the present date, thereby excluding valuable historical information. Instead, in certain embodiments, database tool 125 may update the set date for all users 105 according to an average time over which the database tool 125 has determined that historical data tends to aid in predicting future user access patterns. Updating the set date at specific time intervals, rather than continuously, may be desirable, for example, to conserve system resources.

In certain embodiments, cache predictor 420 uses a machine learning model to calculate the probabilities that user 105A will access the first portion of first table 160 at the future date. In certain embodiments the machine learning model may take the form of a logistic regression model. For example, the logistic regression model may take the form of the equation: output=a1+a2X+a3Y+a4Z, where X is the data the query was submitted, Y is the query, and Z is the user ID associated with the query.

Database tool 125 further determines a second portion of first table 160 that user 105A accesses at a frequency greater than a set frequency in step 525. In certain embodiments, the set frequency is adjustable by users 105. In step 530, database tool 125 copies the second portion of first table 160 into second cache 145. In step 540, database tool 125 determines that a portion of data stored in second cache 145 is also stored in first cache 140 and, in step 550, database tool 125 deletes the portion of data that is stored in the second cache 145 and also stored in first cache 140 from second cache 145.

Modifications, additions, or omissions may be made to method 500 depicted in FIG. 5. Method 500 may include more, fewer, or other steps. For example, steps may be performed in parallel or in any suitable order. While discussed as database tool 125 (or components thereof) performing the steps, any suitable component of system 100, such as device(s) 110 for example, may perform one or more steps of the method.

FIG. 6 is a flowchart illustrating the process 600 of accessing data requested by a user query 150 using the database tool 125 of FIG. 4. Database tool 125 first receives a second query 150 from user 105 in step 605. In step 610, database tool 125 determines whether second query 150 is directed at data stored in first cache 140. If database tool 125 determines that the second query 150 is directed at data stored in first cache 140, database tool 125 accesses the data stored in first cache 140 in step 615. If database tool 125 determines that second query 150 is not directed at data stored in first cache 140, it next determines, in step 620, whether query 150 is directed at data stored in second cache 145. If database tool 125 determines that second query 150 is directed at data stored in second cache 145, it accesses the data stored in second cache 145 at step 625. If database tool 125 determines that second query 150 is not directed at data stored in second cache 145, it then accesses the data stored in first table 160 in step 630.

Modifications, additions, or omissions may be made to method 600 depicted in FIG. 6. Method 600 may include more, fewer, or other steps. For example, steps may be performed in parallel or in any suitable order. While discussed as database tool 125 (or components thereof) performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
   a memory configured to store:
      a first cache; and
      a second cache; and
   a hardware processor communicatively coupled to the memory, the hardware processor configured to:
      copy a first portion of data from a first table stored in a database into a second table stored in the database, the first portion of data from the first table comprising data stored at locations in the first table flagged with an identifier;
      determine that a second portion of data from the first table stored in the database is set to be overwritten, the second portion of data from the first table stored in the database comprising data stored at locations in the first table flagged with the identifier;
      in response to determining that the second portion of the first table stored in the database is set to be overwritten, copy the second portion of data from the first table stored in the database into a third table stored in the database;
      determine, based on a set of historical information, that a probability that a user will access a third portion of the first table stored in the database at a future date is greater than a set threshold;
      in response to determining that the probability that the user will access the third portion of the first table stored in the database at the future date is greater than the set threshold, copy the third portion of the first table stored in the database into the first cache prior to the future date;
      determine a fourth portion of the first table stored in the database that the user accesses at a frequency greater than a set frequency; and
      in response to determining the fourth portion of the first table stored in the database that the user accesses at the frequency greater than the set frequency, copy the fourth portion of the first table stored in the database into the second cache.

2. The apparatus of claim 1, wherein the locations in the first table that are flagged with the identifier are flagged with the identifier at the time the first table is created.

3. The apparatus of claim 1, wherein:
the hardware processor is further configured to, in response to copying the first portion of data from the first table stored in the database into the second table stored in the database:
perform a set of statistical analysis techniques on the first portion of data copied from the first table stored in the database into the second table stored in the database; and
store the results of the set of statistical analysis techniques into the second table stored in the database; and
the set of statistical analysis techniques comprises at least one of determining the mean, the standard deviation, the minimum value, the maximum value, the count, or a given percentile.

4. The apparatus of claim 1, wherein the hardware processor is further configured to perform the step of copying the first portion data from the first table stored in the database into the second table stored in the database at set time intervals.

5. The apparatus of claim 1, wherein the first table stored in the database, the second table stored in the database, and the third table stored in the database contain data stored in contiguous blocks.

6. The apparatus of claim 5, wherein the first portion of data from the first table stored in the database that is copied into the second table stored in the database comprises a set of columns of the first table.

7. The apparatus of claim 1, wherein:
the hardware processor is further configured to, in response to copying the second portion of data from the first table stored in the database into the third table stored in the database:
perform a set of statistical analysis techniques on the second portion of data copied from the first table stored in the database into the third table stored in the database; and
store the results of the set of statistical analysis techniques into the third table stored in the database; and
the set of statistical analysis techniques comprises at least one of determining the mean, the standard deviation, the minimum value, the maximum value, the count, or a given percentile.

8. A method comprising:
copying a first portion of data from a first table stored in a database into a second table stored in the database, the first portion of data from the first table comprising data stored at locations in the first table flagged with an identifier;
determining that a second portion of data from the first table stored in the database is set to be overwritten, the second portion of data from the first table stored in the database comprising data stored at locations in the first table flagged with the identifier;
in response to determining that the second portion of the first table stored in the database is set to be overwritten, copying the second portion of data from the first table stored in the database into a third table stored in the database;
determining, based on a set of historical information, that a probability that a user will access a third portion of the first table stored in the database at a future date is greater than a set threshold;
in response to determining that the probability that the user will access the third portion of the first table stored in the database at the future date is greater than the set threshold, copying the third portion of the first table stored in the database into a first cache prior to the future date;
determining a fourth portion of the first table stored in the database that the user accesses at a frequency greater than a set frequency; and
in response to determining the fourth portion of the first table stored in the database that the user accesses at the frequency greater than the set frequency, copying the fourth portion of the first table stored in the database into a second cache.

9. The method of claim 8, wherein the locations in the first table that are flagged with the identifier are flagged with the identifier at the time the first table is created.

10. The method of claim 8, further comprising in response to copying the first portion of data from the first table stored in the database into the second table stored in the database:
performing a set of statistical analysis techniques on the first portion of data copied from the first table stored in the database into the second table stored in the database; and
storing the results of the set of statistical analysis techniques into the second table stored in the database;
wherein the set of statistical analysis techniques comprises at least one of determining the mean, the standard deviation, the minimum value, the maximum value, the count, or a given percentile.

11. The method of claim 8, further comprising performing the step of copying the first portion data from the first table stored in the database into the second table stored in the database at set time intervals.

12. The method of claim 8, wherein the first table stored in the database, the second table stored in the database, and the third table stored in the database contain data stored in contiguous blocks.

13. The method of claim 12, wherein the first portion of data from the first table stored in the database that is copied into the second table stored in the database comprises a set of columns of the first table.

14. The method of claim 8, further comprising in response to copying the second portion of data from the first table stored in the database into the third table stored in the database:
performing a set of statistical analysis techniques on the second portion of data copied from the first table stored in the database into the third table stored in the database; and
storing the results of the set of statistical analysis techniques into the third table stored in the database;
wherein the set of statistical analysis techniques comprises at least one of determining the mean, the standard deviation, the minimum value, the maximum value, the count, or a given percentile.

15. A system comprising:
a storage element operable to store:
a first cache; and
a second cache; and
a processing element communicatively coupled to the storage element and operable to:
copy a first portion of data from a first table stored in a database into a second table stored in the database, the first portion of data from the first table comprising data stored at locations in the first table flagged with an identifier;
determine that a second portion of data from the first table stored in the database is set to be overwritten, the second portion of data from the first table stored in the database comprising data stored at locations in the first table flagged with the identifier;

in response to determining that the second portion of the first table stored in the database is set to be overwritten, copy the second portion of data from the first table stored in the database into a third table stored in the database;

determine, using a machine learning model operating on a set of historical information, that a probability that the user will access a third portion of the first table stored in the database at a future date is greater than a set threshold;

in response to determining that the probability that the user will access the third portion of the first table stored in the database at the future date is greater than the set threshold, copy the third portion of the first table stored in the database into the first cache prior to the future date;

determine a fourth portion of the first table stored in the database that the user accesses at a frequency greater than a set frequency; and in response to determining the fourth portion of the first table stored in the database that the user accesses at the frequency greater than the set frequency, copy the fourth portion of the first table stored in the database into the second cache.

16. The system of claim 15, wherein the locations in the first table that are flagged with the identifier are flagged with the identifier at the time the first table is created.

17. The system of claim 15, wherein the processing element is further operable to perform the step of copying the first portion data from the first table stored in the database into the second table stored in the database at set time intervals.

18. The system of claim 15, wherein the first table stored in the database, the second table stored in the database, and the third table stored in the database contain data stored in contiguous blocks.

19. The system of claim 18, wherein the first portion of data from the first table stored in the database that is copied into the second table stored in the database comprises a set of columns of the first table.

20. The system of claim 15, wherein:

the processing element is further operable to, in response to copying the first portion of data from the first table stored in the database into the second table stored in the database:

perform a set of statistical analysis techniques on the first portion of data copied from the first table stored in the database into the second table stored in the database; and store the results of the set of statistical analysis techniques into the second table stored in the database; and the set of statistical analysis techniques comprises at least one of determining the mean, the standard deviation, the minimum value, the maximum value, the count, or a given percentile.

* * * * *